Dec. 14, 1926.
A. BRUNNER
1,610,924
GAUGE FOR GASOLINE FEED PIPES
Filed April 3, 1924
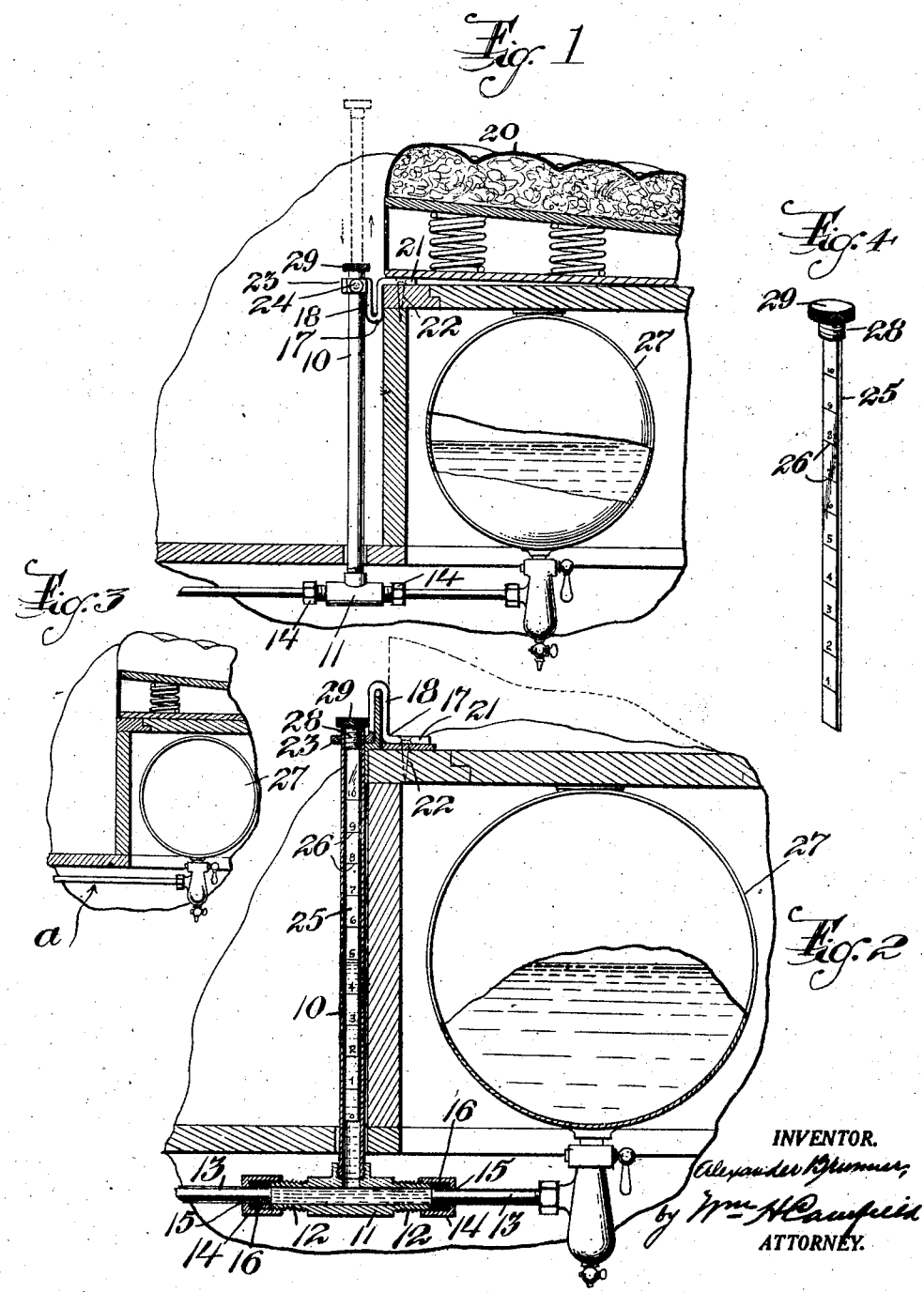

Patented Dec. 14, 1926.

1,610,924

UNITED STATES PATENT OFFICE.

ALEXANDER BRUNNER, OF NEWARK, NEW JERSEY.

GAUGE FOR GASOLINE-FEED PIPES.

Application filed April 3, 1924. Serial No. 703,878.

This invention relates to an improved gauge for gasoline feed pipes and is especially adapted for automobiles. The device is arranged so that it can be located closely adjacent the front seat of an automobile of that type in which the feed pipe passes under the front seat close to the floor. The indicator, usually an ullage rod, can be read without the driver getting out of his seat and at the same time it does not interfere in any way with the comfort of the driver and does not interfere with the operation of the automobile as it is not in any proximity to the steering wheel or the foot pedals.

The invention is designed to provide a unitary structure which is T-shaped and is attached by simply cutting the feed pipe and placing the opposed ends at the severed part to the device by attaching means and there is no necessity of employing a skilled workman to install it as its construction and operation are exceedingly simple.

The invention is illustrated in the accompanying drawing in which Figure 1 is a section showing part of an automobile showing a portion of the front seat in section illustrating my improved gauge in elevation. Figure 2 is a sectional view on a slightly enlarged scale showing a clip used to support the device at the top adapted to a different form of seat from that shown in Figure 1. Figure 3 is a view showing a tank and feed pipe of an automobile previous to the insertion of the gauge and indicating the place where it is inserted. Figure 4 is a perspective view of an ullage rod used in the device.

The device is adapted to be attached to the feed pipe of an automobile and is a unitary structure which contains means on its ends for attaching the severed ends of the feed pipe after the feed pipe is cut.

In Figure 3 I show by means of arrow a, a point where the feed pipe can be cut usually by filing through it and the two opposed ends at the place where the pipe was cut are spread apart which is easily done by the hands as the pipe is small and slightly flexible and then the gauge is inserted.

The gauge is a T-shaped device comprising a vertical tube 10 and a T-joint 11 which is screwed on the ends of the vertical pipe and has screw-threaded extensions 12 against which the ends of the feed pipe 13 abut. A screw-threaded stuffing-box 14 is arranged on each of the screw-threaded parts 12 and has an opening 15 to receive the feed pipe 13 and receives the packing 16 which tightly binds against the ends of the feed pipe 13 when a nut 14 is screwed up tight to compress it so not only is the feed pipe tightly grasped and held but any leakage is prevented.

To relieve the feed pipe of the weight of the device I employ a clip 17 which has a portion that is doubled to form a loop 18 this being the preferred form because in some types of automobiles there is a bar 19 extending across the front of the seat to hold the cushion on and this open loop portion 18 passes over the rib 19 but being made of thin metal does not form any material projection and the cushion 20 rests in its normal position on the seat.

One end 21, of the clip is used for fastening it to the seat as by means of the screws 22 and the other end is formed into an eye 23 into which the vertical pipe 10 fits and which is provided with a binding screw or set screw 24 or other equivalent for holding the vertical pipe 10 in position and thus supports the device and the ends of the feed pipe that are secured thereto.

In the type of seat shown in Figure 1 which does not have the bar 19, the clip is reversed and the loop part 18 extends downwardly and resting against the front of the seat acts as a brace.

The vertical tube 10 is provided with an indicating device and I show the ullage rod 25 which has proper indicating devices 26 to show the depth of liquid in the pipe 10. This depth of liquid of course, is on a level with the liquid in the tank 27 and the markings on the ullage rod will show how many gallons still remain in the tank. The rod is provided with a screw-threaded stopper 28 which fits into the screw-threaded upper end of the tube 10 and has a suitable finger piece 29 on the top thereof to provide for its manipulation.

It will be evident that various changes can be made in the proportion of the parts without departing from the scope of the invention.

I claim:

A liquid level gauge for gasoline tanks comprising a T-shaped tubular fixture, an ullage rod in the vertical tube of said fixture, means on the opposite ends of the cross-tube for securing the fixture to the opposed ends of a feed pipe and a clip comprising a strip bent to form a U-shaped loop adapted to fit over the edge of the support, said clip having an eye on one end to receive the vertical tube and having means on the other end for securing the clip to a support.

In testimony that I claim the foregoing, I have hereto set my hand, this 18th day of March, 1924.

ALEXANDER BRUNNER.